April 8, 1952 V. R. PAWELSKY ET AL 2,592,327
SAFETY CONTROL
Filed June 23, 1949 2 SHEETS—SHEET 1

INVENTORS
VERNON R. PAWELSKY
EDWARD R. RACK
BY John W. Michael
ATTORNEY.

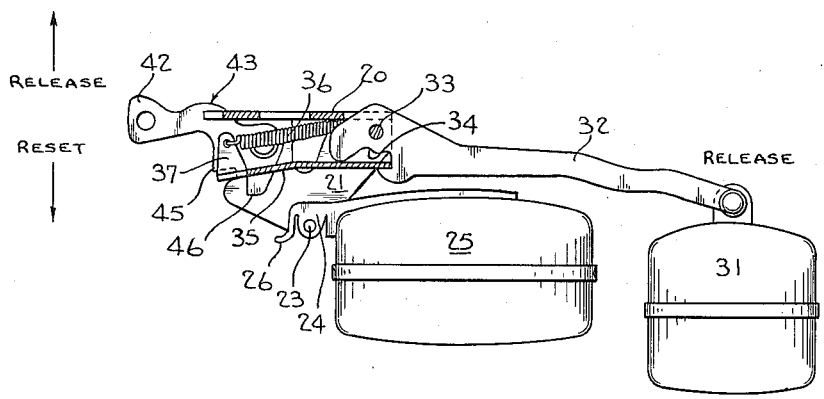
Fig. 6
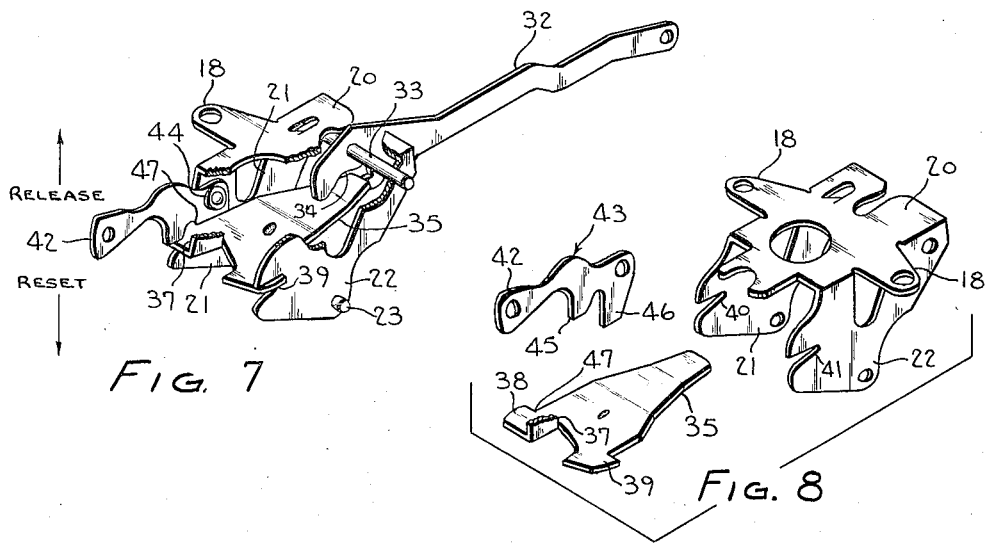
Fig. 7
Fig. 8

Patented Apr. 8, 1952

2,592,327

UNITED STATES PATENT OFFICE 2,592,327

SAFETY CONTROL

Vernon R. Pawelsky and Edward R. Rack, Milwaukee, Wis., assignors to A P Controls Corporation, a corporation of Wisconsin Application June 23, 1949, Serial No. 100,832

7 Claims. (Cl. 137—68)

This invention relates to constant level fuel controls and particularly to providing a control which is safe under all normal and abnormal conditions encountered in use.

Constant level controls are generally used in conjunction with and adjacent to gravity type oil burning space heaters, furnaces, ranges, water heaters, etc. Flow from the control to the burner is regulated by a manually or automatically controlled outlet valve while oil flow into the casing is regulated by a float controlled valve to maintain a constant level in the casing. Should the level increase above the desired constant level due to failure of the inlet valve to close, a safety device releases a striker which forcibly closes the inlet valve to prevent further fuel flow into the casing. The striker may be reset to permit normal operation only after the unusual condition has been eliminated. This feature provides complete safety under abnormal flow conditions.

It sometimes happens, however, that flow conditions will be normal while combustion of the fuel is improper due to some unusual condition. There are a number of situations in which a downdraft exists when the fuel is ignited and causes the flames to mushroom out to the sides of the burner rather than burning normally. Since flow of fuel is not affected under these circumstances, the condition will persist and the flames fan out into the room.

The principal object of this invention is to provide means responsive to the excessive heat caused by the mushrooming flames to interrupt fuel flow to the burner.

Another object is to provide a fuel control having a heat responsive device for tripping the striker to stop fuel flow.

Still another object is to provide a fuel control which is completely safe.

A further object is to provide a fuel control which will interrupt fuel flow to the burner in response to abnormal flow conditions or abnormal combustion at the burner.

Other objects and advantages will be pointed out in, or be apparent from, the specification and claims, as will obvious modifications of the single embodiment shown in the drawings, in which:

Figure 1:
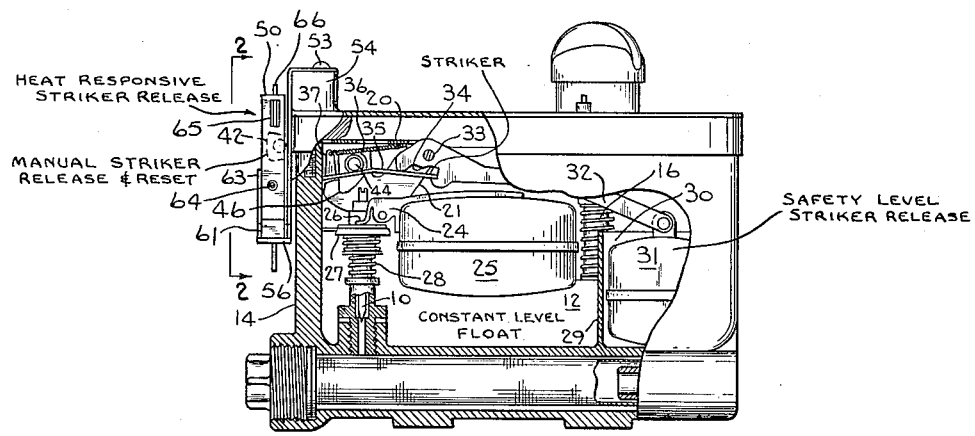
Fig. 1 is a fragmentary elevation, partly in section, illustrating a constant level fuel oil control.
Figure 2:
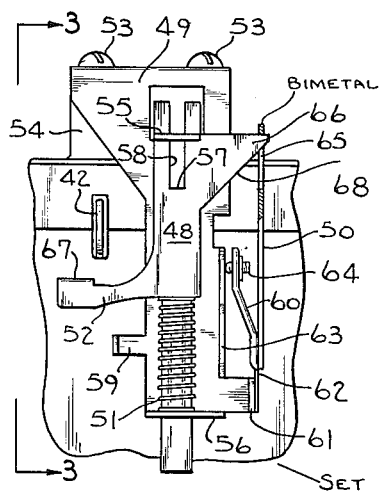
Fig. 2 is an elevation of a portion of Fig. 1 as indicated by line 2—2 and illustrates the normal latched position of the heat responsive device.
Figures 3, 4:
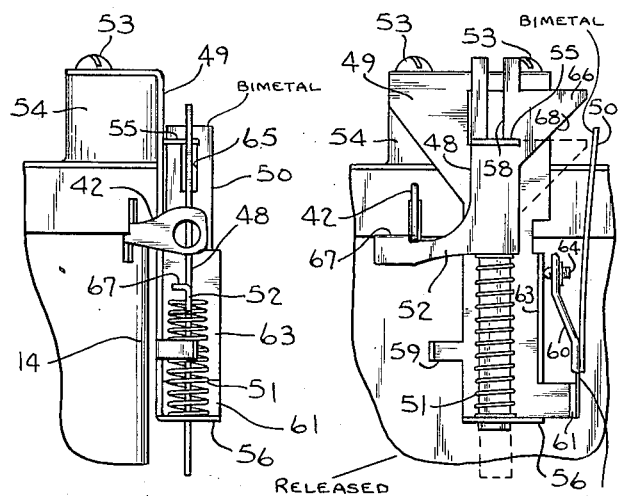
Fig. 3 is taken on line 3—3 of Fig. 2.
Figure 5:
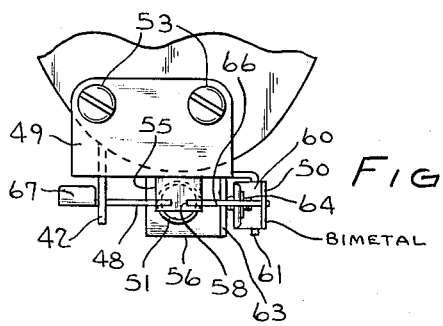

Fig. 4, similar to Fig. 2, shows the released position of the heat responsive device;

Fig. 5 is a top view of Fig. 2;

Fig. 6 is an elevation, partly in section, of the striker and mechanism associated therewith;

Fig. 7 is a perspective view, with parts broken away, of the mechanism illustrated in Fig. 6; and Fig. 8 is an exploded perspective view of the striker assembly.

Referring to the drawings more in detail, the constant level fuel control illustrated in the drawings is adapted for mounting in the proximity of the space heater, furnace, or other burner which it supplies. The float controlled inlet valve 10 is regulated to maintain a constant level in chamber 12 in casing 14 to maintain the pressure head on the manually operated outlet valve 16 constant for uniform metering characteristics. While the outlet valve is shown as being manually controlled, it will be understood that it may be automatically regulated if desired.

The outwardly projecting ears 18, 18 of bracket 20 are rigidly mounted in casing 14 above the inlet valve 10 with the depending bracket skirts 21, 22 supporting pin 23 which serves as the pivot for arm 24 secured to the constant level float 25. The arm 24 is provided with a bifurcated arcuate end 26 adapted to bear against plate 27 to transmit float movements to valve 10 in opposition to compressed spring 28 to maintain a constant level in chamber 12.

The level in chamber 12 is ordinarily maintained below the upper edge of dam 29. Should the inlet valve 10 stick or improperly seat, the oil rises above dam 29, overflows into chamber 30, and raises safety float 31. The safety float is pivotally mounted on the right-hand end of arm 32 which pivots on pin 33 supported by bracket 20. The left-hand end of arm 32 is provided with jaws 34 which normally retain striker plate 35 in an inoperative position. A spring 36 tensioned between bracket 20 and upstanding lug 37 on striker plate 35 serves to hold ears 38, 39 seated in their respective slots 40, 41 in the depending bracket skirts 20, 21. The spring additionally serves to bias the striker in a direction tending to move the striker clockwise about the pivot axis determined by the engagement of the striker ears and the bracket notches. Thus when the safety float 31 is raised by reason of fuel oil overflowing into chamber 30, arm 32 pivots about pin 33 to move jaws 34 out of engagement with the free end of the striker, and spring 36 moves the striker downwardly to forcibly seat inlet valve 10.

After the level in overflow chamber 30 has been restored to normal the striker may be reset by depressing the exposed end 42 of the crank 43 pivotally mounted on pin 44 carried by the bracket. When end 42 is depressed, the depending finger 45 bears against striker plate 35 to move the plate counter-clockwise about its pivotal axis for reengagement with jaws 34 in arm 32. It will, of course, be obvious that the striker cannot be reset in the jaws until the abnormal level in the control has been remedied and the safety float has resumed its normal position resting on the floor of the overflow chamber 30.

Should it be desired to manually trip the striker, crank end 42 may be raised to cause finger 46, depending between the striker and the inside of bracket skirt 21, to engage striker ear 38 at 47 and move the striker in a generally horizontal plane about a pivot point determined by the engagement of ear 39 with its respective notch 41. This crabwise movement disengages the free end of striker 35 from the jaws 34 and allows the striker to punch valve 10 closed.

As pointed out in the preamble, under certain atmospheric conditions a down-draft may cause the flame in the burner to mushroom downwardly and outwardly, thus creating a dangerous condition. To render this fuel control safe under these conditions, a device responsive to this abnormal heat is provided on the exterior of the casing in a position where it may automatically raise the exposed crank end 42 to trip the striker. Normally however, this device does not interfere with the usual manual operation of the striker trip 43. Broadly this device comprises a vertically movable spring loaded latch 48 carried and guided by a bracket 49 and normally retained in an inoperative position by a bimetallic keeper 50 which responds to a predetermined temperature to warp and permit the latch spring 51 to drive the latch upwardly. As the latch moves upwardly, the laterally projecting arm 52 strikes and raises crank end 42 to trip the strike plate 35 in the manner set forth above. Bracket 49 is secured to the casing by means of pair of screws 53, 53 threaded into an intermediate mounting block 54 to maintain the bracket and the vertically movable latch 48 properly related with respect to the crank end 42. Mounting block 54 is not necessary when the control is equipped with an automatic top due to the increased thickness of such a top. The upper lug 55 of parallel horizontal lugs 55, 56, struck from the bracket adjacent the upper and lower ends thereof, is provided with a pair of opposed notches receiving the upper bifurcated end of latch 48 while the lower lug 56 is provided with a slot receiving the lower end of the latch. This mounting permits latch movement between upper and lower positions determined respectively by contact between the end 57 of slot 58 in the bifurcated latch with bracket lug 55 and by contact between latch arm 52 and stop 59 struck from the bracket.

The bimetallic keeper 50 and its calibrating arm 60 are connected to bracket projection 61 by means of a leaf spring 62 biasing the keeper and arm to the left (Fig. 2) toward an outwardly projecting bracket flange 63. The spacing between flange 63 and arm 60 is determined by calibrating screw 64 which permits the bimetallic keeper to be adjusted for accurate response to the desired temperature. The upper end of keeper 50 is provided with a keeper slot 65 adapted to receive the laterally projecting latch arm 66. The heat of flames mushrooming from the the burner will warp bimetallic keeper 50 from its position in Fig. 2 to the position shown in Fig. 4 to let spring 51 drive the latch upwardly to trip the striker (movement from the dotted line to the full line position in Fig. 4) and interrupt fuel flow into the casing. After the inlet has thus closed, it will be but a short time until the burner goes out even though the outlet valve remains open.

The striker cannot be reset so long as the bimetal is warped. Depressing the rest lever 42 will cock the latch as the arm overtravels to engage the striker in the jaws. It will be noted that the downwardly disposed inclined face 68 will cam the bimetal to the right until the keeper slot 65 is properly aligned to engage latch arm 66.

Thus the inlet valve 10 is normally controlled by float 25 to maintain a predetermined constant level in the casing 14. Should the level become excessive for any reason, oil flows into chamber 30, raises float 31 to withdraw the jaws 34 from striker plate 35 and permit the striker to punch the valve closed. This overflow release must be manually reset by means of striker trip 43 but cannot be reset until the abnormal condition has been remedied. Should the flow conditions be normal but the burner condition abnormal, the bimetallic keeper 50 will warp to permit the latch to raise trip end 42. When the crank end 42 is raised, striker plate 35 is moved crabwise out of engagement with the jaws and punches the valve closed. The striker must be manually reset to place the control in operation again, and the resetting automatically cocks the latch. As pointed out above, when the heat responsive device is latched in its normal position the striker reset lever may be manually operated to release the striker when raised or to reset the striker when depressed.

The complete safety of this device will now be apparent. The inlet valve may be positively closed either manually by means of the reset crank 43 or automatically either by means of the safety overflow release or by means of the heat responsive release. If the striker has been released automatically, the device which has occasioned its release must first be restored to its normal condition before the control may be placed back into operation. It is also to be noted that any of the striker releases may be operated independently of the position of the others. This control, therefore, regulates fuel flow under all normal and abnormal conditions encountered in use. Those skilled in the art will readily appreciate the desirability of these features as well as the fact that various modifications may be made without departing from the scope of the invention. It is to be understood, therefore, that the scope of this invention is to be limited only by the claims.

We claim:

1. A fuel flow control device, comprising, a casing, a valve for controlling flow into said casing, means for regulating said valve to maintain a constant level, a striker positioned for movement into contact with said valve, means biasing said striker into forcible contact with said valve, means normally holding said striker in an inactive position, means for releasing said striker for movement under the influence of said biasing means in response to a predetermined increase in fuel level in said casing above said constant level, manual means for resetting said striker in said inactive position, said manual means also being operative to release said striker, means adapted to contact and actuate said manual means to release said striker, means at all times tending to bias said actuating means into contact with said manual means, and means for retaining said actuating means in a normal position out of contact with said manual means to permit reset and release operation of said manual means, said retaining means being responsive to a predetermined temperature to release said actuating means.

2. The combination with a casing having a valve, a float controlling said valve to maintain a constant level in said casing, a striker biased into contact with said valve for forcibly closing said valve, means for holding said striker in an inactive position out of contact with said valve, and means manually operable from the exterior of the casing for releasing said striker from said holding means when moved in one direction and for resetting said striker in said holding means when moved in another direction, of latch means mounted on the exterior of said casing, a spring biasing said latch into contact with said manual means for moving said manual means in said one direction to release said striker, a keeper normally engaging and retaining said latch means in an inoperative position out of contact with said manual means, and means responsive to a predetermined ambient temperature to disengage said latch and said keeper so said spring may drive said latch into contact with said manual means to move said manual means in said one direction.

3. The combination with a casing having a valve, a float controlling said valve to maintain a constant level in said casing, a striker biased into contact with said valve for forcibly closing said valve, means for holding said striker in an inactive position out of contact with said valve, and means manually operable from the exterior of the casing for releasing said striker from said holding means when moved in one direction and for resetting said striker in said holding means when moved in another direction, of latch means mounted on the exterior of said casing, a spring biasing said latch into contact with said manual means for moving said manual means in said one direction to release said striker, and a bimetallic keeper normally engaging and retaining said latch means in an inactive position out of contact with said manual means and responsive to a predetermined ambient temperature to release said latch for moving said manual means in said one direction.

4. The combination with a casing having a valve, a float controlling said valve to maintain a constant level in said casing, a striker biased into contact with said valve for forcibly closing said valve, means for holding said striker in an inactive position out of contact with said valve, and means manually operable from the exterior of the casing for releasing said striker from said holding means when moved in one direction and for resetting said striker in said holding means when moved in another direction, a bracket mounted on the exterior of the casing, a latch mounted on said bracket for movement between a first position when it has moved said manual means to release said striker and a second position out of contact with said manual means and permitting normal release and reset operation of the manual means, a spring biasing said latch to said first position, and a bimetallic keeper normally connecting said latch and said bracket to retain said latch in said second position, said keeper being responsive to a predetermined ambient temperature to release said latch for movement to said first position.

5. A fuel flow control device, comprising, a casing, a valve for controlling flow into said casing, means for regulating said valve to maintain a constant level, a striker positioned for movement into contact with said valve, means biasing said striker into forcible contact with said valve, means normally holding said striker in an inactive position, manually operated means for releasing said striker from said holding means and for resetting said striker in said holding means, means adapted to contact and actuate said manual means to release said striker, means at all times tending to bias said actuating means into contact with said manual means, and means for retaining said actuating means in a normal position out of contact with said manual means to permit reset and release operation of said manual means, said retaining means being responsive to a predetermined temperature to release said actuating means.

6. A fuel flow control device, comprising, a casing, a valve for controlling flow into said casing, means for regulating said valve to maintain a constant level, a striker positioned for movement into contact with said valve, means biasing said striker into forcible contact with said valve, means normally holding said striker in an inactive position, manually operated means for releasing said striker from said holding means and for resetting said striker in said holding means, said manual means being movable in one direction to release said striker and in another direction to reset said striker, safety means adapted to contact and move said manual means in said one direction, means at all times tending to bias said safety means into contact with said manual means, means for retaining said safety means out of contact with said manual means to permit normal release and reset operation of said manual means and being responsive to a predetermined ambient temperature to release said safety means for actuation of said manual means in said one direction to release said striker.

7. A fuel flow control device, comprising, a casing, a valve for controlling flow into said casing, means for regulating said valve to maintain a constant level, a striker positioned for movement into contact with said valve, means biasing said striker into forcible contact with said valve, means normally holding said striker in an inactive position, manually operated means for releasing said striker from said holding means and for resetting said striker in said holding means, said manual means being movable in one direction to release said striker and in another direction to reset said striker, latch means adapted to move said manual means in said one direction, a spring biasing said latch into contact with said manual means, a keeper normally engaging said latch means to retain said latch means out of contact with said manual means and responsive to a predetermined ambient temperature to release said latch means for movement under the influence of said spring to move said manual means in said one direction.

VERNON R. PAWELSKY.
EDWARD R. RACK.

REFERENCES CITED

The following references are of record in the file of this patent:

UNITED STATES PATENTS

| Number | Name | Date |
| --- | --- | --- |
| 1,807,310 | Ellman | May 26, 1931 |
| 1,892,948 | Harvey | Jan. 3, 1933 |
| 2,288,536 | McCarty | June 30, 1942 |
| 2,346,813 | Breese | Apr. 18, 1944 |
| 2,389,519 | Landon | Nov. 20, 1945 |